United States Patent
Dobson

(10) Patent No.: US 7,131,809 B2
(45) Date of Patent: Nov. 7, 2006

(54) BODY BOLT ABSORBER ASSEMBLY

(75) Inventor: Kenneth S. Dobson, Chicago, IL (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 10/392,467

(22) Filed: Mar. 19, 2003

(65) Prior Publication Data

US 2003/0180122 A1   Sep. 25, 2003

Related U.S. Application Data

(60) Division of application No. 10/188,379, filed on Jul. 2, 2002, now Pat. No. 6,705,814, which is a continuation of application No. 09/778,376, filed on Feb. 7, 2001, now Pat. No. 6,435,793.

(51) Int. Cl.
   *F16B 1/00*   (2006.01)
   *F16B 43/00*  (2006.01)

(52) U.S. Cl. .................. 411/533; 411/369; 411/371.2; 470/4

(58) Field of Classification Search ............... 411/369, 411/370, 371.1, 533, 542, 544, 999; 470/3, 470/4
   See application file for complete search history.

(56) References Cited

U.S. PATENT DOCUMENTS

| | | | | |
|---|---|---|---|---|
| 1,096,846 A | * | 5/1914 | Lane | 198/688.1 |
| 3,013,643 A | * | 12/1961 | Perry | 403/224 |
| 3,131,742 A | * | 5/1964 | Munse | 411/301 |
| 3,350,042 A | * | 10/1967 | Stewart et al. | 267/141.4 |
| 3,802,476 A | * | 4/1974 | Hoadley | 411/82 |
| 3,910,588 A | * | 10/1975 | Austin | 411/542 |
| 4,092,896 A | * | 6/1978 | Puchy | 411/542 |
| 4,136,598 A | * | 1/1979 | Hughes | 411/372 |
| 4,355,933 A | * | 10/1982 | Fischer | 411/19 |
| 5,020,951 A | * | 6/1991 | Smith | 411/107 |
| 5,255,647 A | * | 10/1993 | Kiczek | 123/195 C |
| 5,462,395 A | * | 10/1995 | Damm et al. | 411/107 |
| 5,755,545 A | * | 5/1998 | Banks | 411/482 |
| 5,915,901 A | * | 6/1999 | Aasgaard | 411/29 |
| 6,280,132 B1 | * | 8/2001 | Szczukowski et al. | 411/353 |
| 6,302,385 B1 | | 10/2001 | Summers, III et al. | |

* cited by examiner

*Primary Examiner*—Katherine Mitchell
(74) *Attorney, Agent, or Firm*—Mark W. Croll; Paul F. Donovan

(57) ABSTRACT

The body bolt absorber assembly includes a lower body absorber made from rubber or a similar material with an undersized aperture, formed either during manufacture or by subsequent piercing, to slideably engage and capture a bolt. The lower body absorber further includes interior cylindrical walls with an inwardly extending lip thereby forming a chamber to engage and capture a washer. The washer includes an aperture through which the shaft of the bolt passes. The engagement and capture of the bolt and the washer provides for a one-piece modular assembly.

6 Claims, 3 Drawing Sheets

BODY BOLT ABSORBER ASSEMBLY

This application is a division of application Ser. No. 10/188,379 filed on Jul. 2, 2002, U.S. Pat. No. 6,705,814 entitled "Body Bolt Absorber Assembly" which is a continuation of application Ser. No. 09/778,376 filed on Feb. 7, 2001, entitled "Body Bolt Absorber Assembly" now U.S. Pat. No. 6,435,793.

BACKGROUND OF THE INVENTION

1. Field of the Invention

The present invention pertains to a modular body bolt absorber assembly, for assembling an isolator to the frame of an automotive vehicle.

2. Description of the Prior Art

In the prior art, it is known to use assemblies including a bolt to assemble a shock absorber to the frame of an automotive vehicle.

An example of such a prior art assembly is shown in FIG. 1. Prior art assembly 100 includes bolt 102 with head 104 and shaft 106. Shaft 106, which includes threaded portion 107, extends through aperture 110 of washer 108. Shaft 106 further passes through aperture 116 of metallic base 114 of lower body absorber 112. Lower body absorber 112 further includes rubber bumper portion 118 which is rotationally symmetric with a hollow interior 120 and a forward tip 122 in the shape of a truncated cone. Rubber bumper portion 118 is typically secured to metallic base 114 by the use of adhesive.

In the assembled position, head 104 of bolt 102 urges washer 108 against metallic base 114. Shaft 106 of bolt 102 typically further passes through an aperture in the automotive frame (not shown) and threaded portion 107 of shaft 106 of bolt 102 engages a threaded aperture in the absorber (not shown) or a nut in the body of the vehicle. In this assembled position, rubber bumper portion 118 engages an end of the absorber (not shown). This configuration assembles the absorber to the automotive frame while providing cushioning between the frame and the body of the vehicle.

While this prior art absorber assembly has been satisfactory in many respects, improvement is desired in some aspects. In particular, the assembly includes three components which increases assembly time and secondary processing thereby decreasing cost effectiveness. Moreover, this can lead to inconsistencies in the attachment of successive assemblies.

Similarly, improvements are sought with respect to modularity of design, ease of design changes and serviceability.

Additionally, chemical or adhesive bonding is required in the manufacture of the lower body absorber in this prior art design.

OBJECTS AND SUMMARY OF THE INVENTION

It is therefore an object of the present invention to provide a body bolt absorber assembly which can be provided as a single modular unit.

It is therefore a further object of the present invention to provide a body bolt absorber assembly which decreases assembly time and secondary processing.

It is therefore a still further object of the present invention to provide a body bolt absorber assembly with increased cost effectiveness.

It is therefore a still further object of the present invention to provide a body bolt absorber assembly with a modular design which allows for ease of design changes and serviceability.

It is therefore a final object of the present invention to provide a body bolt absorber assembly which eliminates or reduces the use of chemical or adhesive bonding.

These and other objects are attained by providing a body bolt absorber with a lower body absorber made from rubber which is arranged and constructed to capture a bolt and a washer thereby forming a modular one-piece assembly. More particularly, the central aperture of the lower body absorber is undersized with respect to the diameter of the shaft of the bolt. The elasticity of the rubber allows the bolt to pass through this aperture but be slideably captured therewithin. Alternatively, the bolt may be pushed so as to pierce the wall to form such an aperture wherein the walls of the resulting aperture allow the bolt to pass through but be slideably captured therewithin. Similarly, the lower body absorber may include a circumferential lip to capture the washer through which the shaft of the bolt passes.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
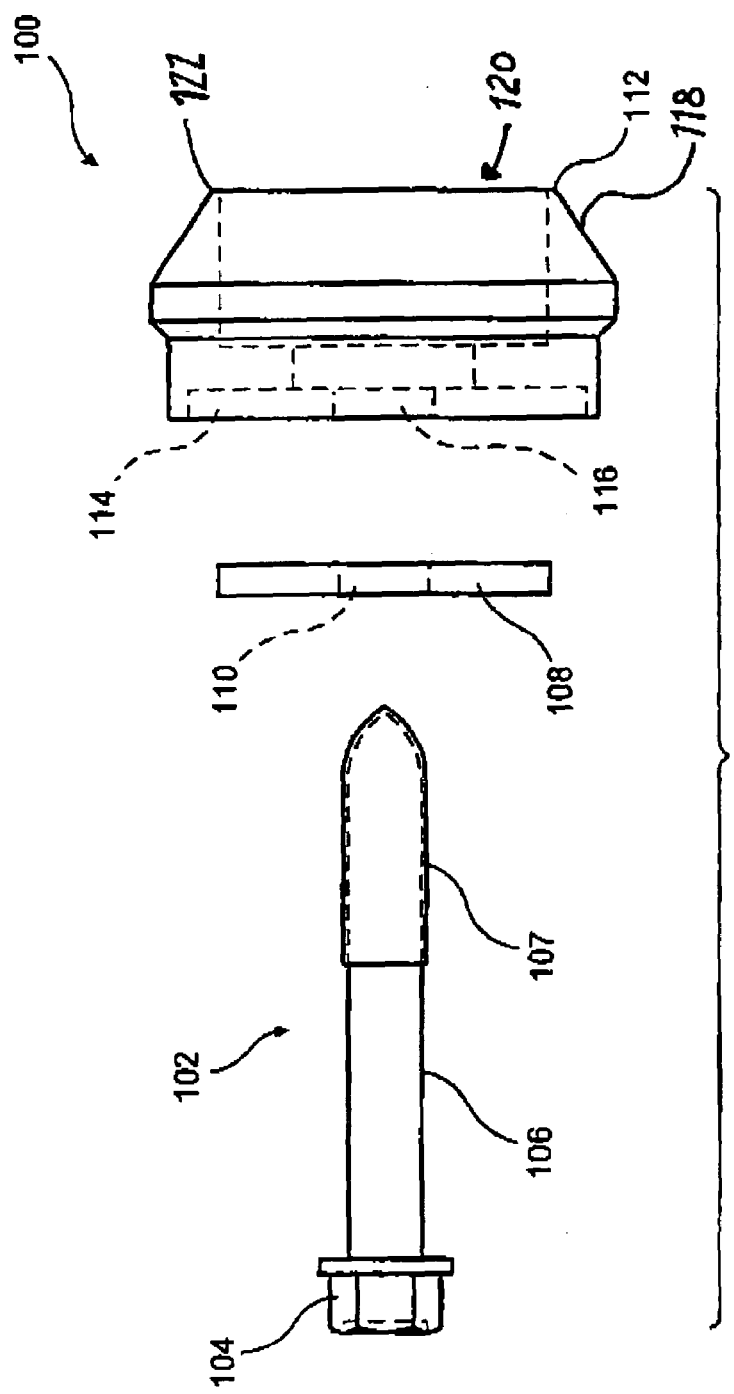
FIG. 1 is an exploded plan view, partly in phantom, of a body bolt absorber assembly of the prior art.
Figure 2:
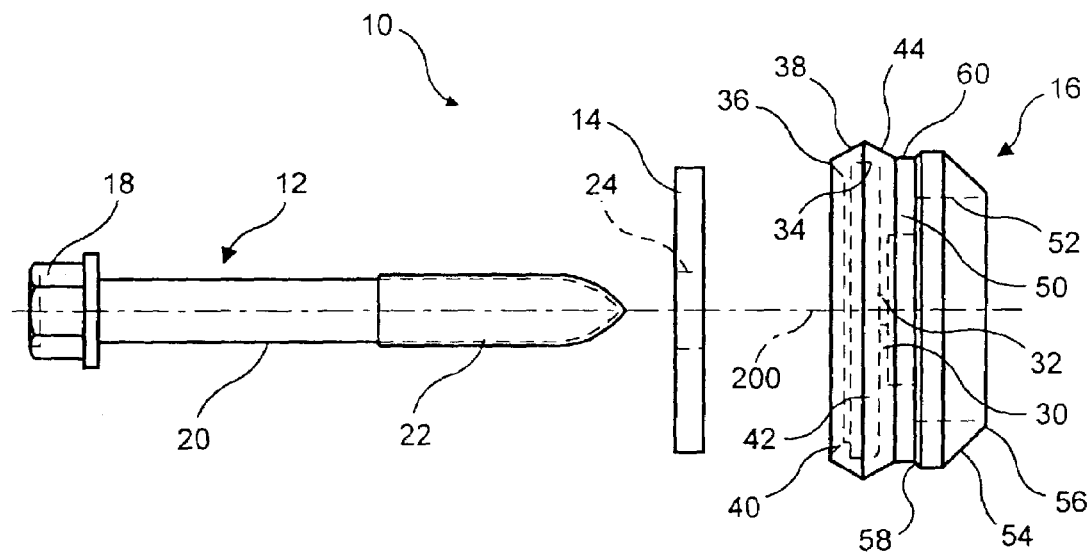
FIG. 2 is an exploded plan view, partly in phantom, of the body bolt absorber assembly of the present invention.

Referring now to the drawings wherein like numerals indicate like elements throughout the several views, one sees that FIG. 2 is an exploded plan view of the body bolt absorber assembly 10 of the present invention. Body bolt absorber assembly 10 includes bolt 12, washer 14 and lower body absorber 16.

Bolt 12, as known in the prior art, includes head 18 and shaft 20. Shaft 20 includes threaded portion 22. Washer 14 is made from metal and, as known in the prior art, includes central aperture 24 through which shaft 20 of bolt 12 passes.

Lower body absorber 16 is shown in more detail in FIGS. 4–7 and is typically made from butyl rubber, although those skilled in the art will recognize that a range of equivalents is available. Lower body absorber 16 is preferably rotationally symmetric about axis 200.

Wall 30 is formed transversely to axis 200 includes central aperture 32 which is undersized with respect to the diameter of shaft 20 of bolt 12. However, the elasticity of the butyl rubber or equivalent material allows central aperture 32 to stretch whereby shaft 20 can pass through central aperture 32 and be slideably captured therewithin. Alternately, wall 30 may be formed with aperture 32 not initially present, and wherein the user pushes bolt 12 so as to pierce wall 30 thereby forming undersized aperture 32 with the same function described above. Preferably, rearward interior cylindrical wall 34 is formed inwardly adjacent from a periphery of wall 30 with inwardly extending circumferential lip 36 formed at the end 38 thereof. As shown in more detail in FIG. 7, inwardly extending circumferential lip 36 includes rearward chamber 40. The structure of rearward interior cylindrical wall 34 and inwardly extending circumferential lip 36 forms disk-shaped cavity 42 rearwardly adjacent from wall 30 to capture washer 14 in the assembled position. Aperture 16 of washer 14 is aligned with aperture 32 of wall 30 along axis 200. First exterior circular chamber 44, with a triangular cross section, is formed on a radial exterior of cylindrical wall 34.

Thickened reinforcing section 50 is formed frontwardly from wall 30 and about approximately the outward half of the radius of wall 30. Forward interior cylindrical wall 52 rises from thickened reinforcing section 50 and meets forward exterior oblique wall 54 to form circular apex 56. Second exterior circular chamber 58 is formed at a rearward end of exterior oblique wall 54. Exterior cylindrical wall 60 separates first and second exterior circular chamfers 44, 58.

Figure 3:
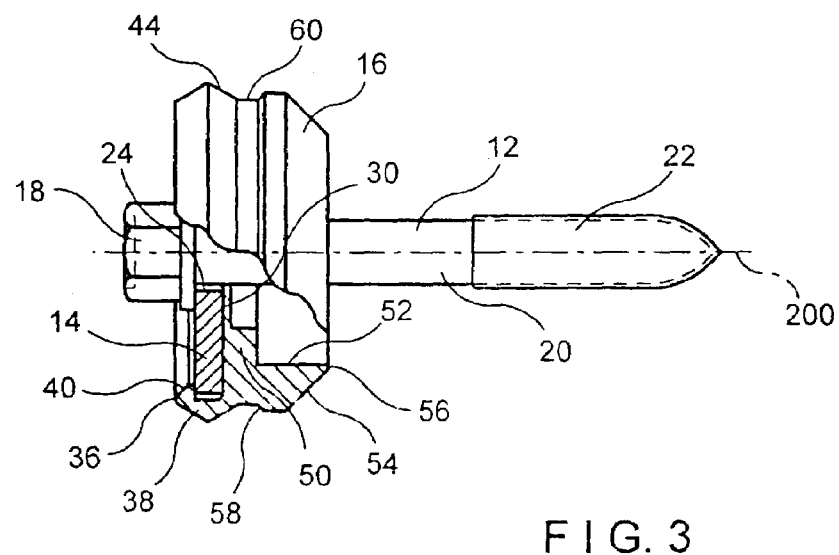
FIG. 3 is a plan view of the assembled position of the body bolt absorber assembly of the present invention.
Figure 4:
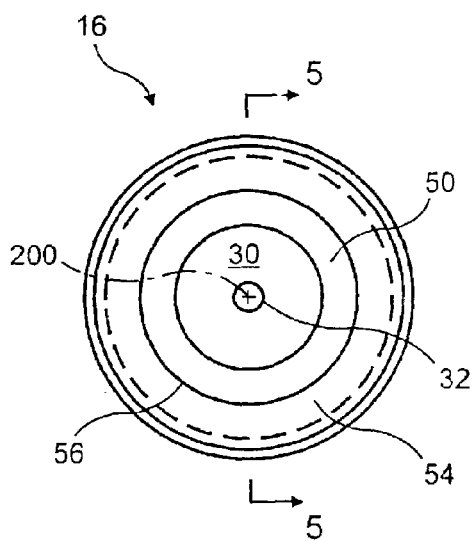
FIG. 4 is a front plan view of the lower body absorber of the body bolt absorber assembly of the present invention.
Figure 5:
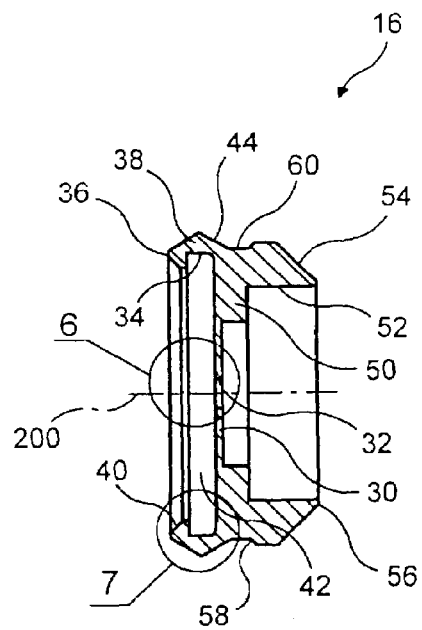
FIG. 5 is a cross-sectional view along plane 5—5 of FIG. 4, of the lower body absorber of the body bolt absorber assembly of the present invention.
Figure 6:
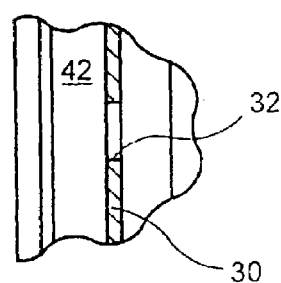
FIG. 6 is a detailed view of cross-sectional area 6 of FIG. 5, of the lower body absorber of the body bolt absorber assembly of the present invention.
Figure 7:
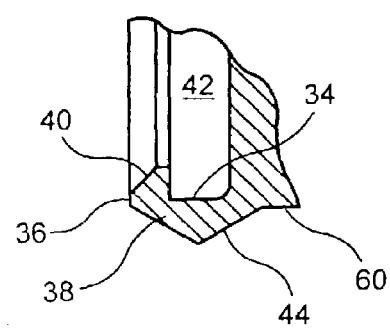
FIG. 7 is a detailed view of cross-sectional area 7 of FIG. 5, of the lower body absorber of the body bolt absorber assembly of the present invention.

To use body bolt absorber assembly 10, the installer typically receives assembly in the pre-assembled configuration shown in FIG. 3. Shaft 20 of bolt 12 is passed through an aperture in the automotive frame so that threaded portion 22 will be received within a threaded aperture of the shock absorber and an end of the shock absorber (not shown) or nut in the body of the vehicle is engaged by lower body absorber 16.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A method of forming a modular body bolt absorber assembly comprising:

securing a generally flat washer to a body absorber, the washer having a top surface, a bottom surface and an aperture with an axis therethrough, wherein the body absorber includes a portion that extends beyond said bottom surface, said portion being adapted for engagement with an independent mating structure that is substantially parallel to said bottom surface and transverse to said axis;

providing a wall of flexible material that is formed substantially transversely to the axis, the wall being arranged such that the axis extends therethrough; and passing a bolt through the aperture of the washer and the wall of flexible material such that the elasticity of the flexible material expands so that the bolt can be pushed and slidably captured by the flexible material to complete the modular body bolt absorber assembly so as to provide an unthreaded engagement between the flexible material and the bolt.

2. The method of claim 1 wherein an aperture in the wall of flexible material is formed by the bolt piercing the wall.

3. The method of claim 1 wherein the body absorber and the wall of flexible material are made of rubber.

4. The method of claim 3 wherein the body absorber and the wall of flexible material are made as one.

5. A method of forming a modular body bolt absorber assembly comprising:

securing a washer to a body absorber, the washer having an aperture with an axis therethrough;

providing a wall of flexible material that is formed substantially transversely to the axis, the wall being arranged such that the axis extends therethrough;

passing a bolt through the aperture of the washer and a aperture of the wall of flexible material that is formed by a shaft of the bolt piercing the wall such that the elasticity of the flexible material allows the axis of the wall of flexible material to expand so that the bolt can be pushed and slidably captured by the flexible material to complete the modular body bolt absorber assembly so as to provide an unthreaded engagement between the flexible material and the bolt.

6. The method of claim 1 wherein an aperture smaller than the bolt diameter is provided in the wall of flexible material through which the bolt passes.

* * * * *